(12) United States Patent
Snyder

(10) Patent No.: US 6,392,635 B1
(45) Date of Patent: May 21, 2002

(54) MOUSE DEVICE HAVING RETRACTABLE CORD AND CONNECTOR STORAGE

(76) Inventor: Robert F. Snyder, 919 Highland Dr., Madison, AL (US) 35758

(*) Notice: Subject to any disclaimer, the term of this patent is extended or adjusted under 35 U.S.C. 154(b) by 0 days.

(21) Appl. No.: 09/488,279

(22) Filed: Jan. 20, 2000

(51) Int. Cl.[7] .................................................. G09G 5/08
(52) U.S. Cl. ...................................... 345/163; 345/157
(58) Field of Search ................................ 345/163, 157, 345/179; 361/683, 686

(56) References Cited

U.S. PATENT DOCUMENTS

| | | | |
|---|---|---|---|
| 5,126,955 A | | 6/1992 | Tomodo |
| 5,655,143 A | * | 8/1997 | Alpert et al. ............... 361/600 |
| 5,670,989 A | | 9/1997 | Owen |
| 5,671,833 A | * | 9/1997 | Edwards et al. ....... 191/12.2 R |
| 5,750,934 A | | 5/1998 | Kuljis |
| 6,088,021 A | * | 7/2000 | Yong .......................... 345/163 |

OTHER PUBLICATIONS

Sailnet Store web page at http://www.sailnet.com showong product No. RF494, Ronstan Vee Jammer Cleat.*
Sears Kenmore vacuum cleaner, model unknown, known before 1985.*

* cited by examiner

Primary Examiner—Steven Saras
Assistant Examiner—William C. Spencer
(74) Attorney, Agent, or Firm—F. T. Morelle

(57) ABSTRACT

A computer mouse having cord management and cord connector storage and protection features. The feature for storing, deploying and retracting the device's cord in, from and into its case is an internal capstan, principally a reel, that is spring-biased to return to its retracted position. A pawl and ratchet assembly is used to fix or stabilize the cord at points of its extension; alternatively, a snubbing feature is shown that obviates the pawl and ratchet assembly. For securing the connector, thereby protecting it during transport, there is included in the case design a pocket or port into which the connector is retracted.

3 Claims, 4 Drawing Sheets

MOUSE DEVICE HAVING RETRACTABLE CORD AND CONNECTOR STORAGE

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to a manually sweepable, electromechanical computer input device known as a mouse and, particularly, to such a mouse that contains within its physical structure certain improvements, the most prominent of which is a mechanism for playing out, fixing or stabilizing and retracting the mouse cord or cable. Additional aspects of the invention include preferred and alternate embodiments for said fixing or stabilizing of the (extended) cord, as well as a pocket, within the body of the improved mouse design, that serves as a storage port for the cord-to-computer connector.

2. Discussion of Relevant Art

The mouse style disclosed hereinafter is of the conventional, palm-sized type and is used with laptop and desktop computers or calculators which feature mouse input ports that are proximate the mouse work station or pad.

Relevant to this disclosure, yet having significant distinction therefrom, is U.S. Pat. No. 5,216,955 ('955), issued for MANUALLY SWEEPABLE APPARATUS HOUSED IN A COMPUTER MAIN BODY. The device disclosed therein is a laptop computer mouse of less-than-conventional size which is storable in a depressed portion of the computer, adjacent the keyboard. The mouse is rendered operative by manually removing it from the stored position and drawing its cord from the computer body. A take-up reel within the computer body serves to play out and take in the cord; but, the '955 disclosure dismisses further discussion of this mechanism: "Various automatic take-up reels are known . . . ". In essence, '955 shows a laptop computer having a detachable, onboard mouse that is physically connected to the computer by means of a computer-stored, extendable-retractable cord, but does not expound on the more detailed aspects of the latter feature.

Another relevant disclosure is made in U.S. Pat. No. 5,670,989 ('989), issued for COMMUNICATIONS AUXILIARY MODULE. The module of this disclosure is used as an organizer for managing the excess or slack cord associated with a computer mouse and/or keyboard device. In two distinct embodiments, the mouse and keyboard cords, of apparently standard length, are taken up by, and played out from, a stand-alone apparatus that is merely an adjunct to a desktop computer. No suggestion of its incorporation into a computer or, more significantly, into a mouse is made.

It thus appears that two highly desirable features, namely cord management for the small data input/output (I/O) device (e.g., mouse, hand scanner, telephone) and the storage of its connector, both in/on the device, have been wanting in the art. Although, to some extent, efforts have been made to incorporate these features in either a laptop computer or a desktop organizer, I believe my invention eclipses those efforts with respect to a number of data I/O devices, irrespective of their sizes.

INCORPORATION BY REFERENCE

Because of their materiality to the field and their particular relevance to the instant invention relative to onboard mouse devices and cord management, U.S. Pat. Nos. 5,126,955 and 5,670,989 are incorporated by reference, the former for its disclosure of a laptop computer having an I/O device storable thereon and containing cord management means therein, and the latter for its showing of a stand-alone dual cord management system.

DEFINITIONS

As used throughout this paper, the following boldfaced words or terms shall have the indicated meanings:

col defines a saddle or cup-shaped void;

capstan is a reel or spooling device;

cord/electrical cord is an electrical conduit;

data input/output device is a component, electrical or mechanical (electromechanical) that generates or otherwise acquires and transfers data signals to another component;

data receiver is a component or machine to which a data signal is directed;

I/O is an acronym meaning either input or output, or logically, both;

pawl is a mechanical member that presents a tang, a tongue-like extension, for engagement with a notched or tooth-bearing member; and pocket is a designed void in a member, case or housing of a device.

Other terms will be defined hereinafter as may become necessary and will be presented parenthetically within the text.

BRIEF SUMMARY OF THE INVENTION

As mentioned above, two highly desirable features have been wanting generally in I/O devices, and particularly in computer mouse design. Although attempts have been made to alleviate the cord management problem, there appears little has been done to otherwise secure the cord connector for the vast number of I/O devices that employ such, for example, telephone receivers, portable scanners, microphones, etc. I have overcome these deficiencies, conceptually, by reducing them to practice in their application to a particular device—a computer mouse. Those of ordinary skill will realize that what is applied herein is applicable to a host of I/O devices that are encountered in many scientific and industrial circles.

The feature for storing, deploying and retracting the device's cord in, from and into its case is an internal capstan or flanged reel that is spring biased to return to its retracted position. A pawl and ratchet configuration is used to fix or stabilize the cord at points of its extension. For securing the connector, thereby protecting it during transport, I have included in the case design a pocket or port into which the connector is retracted.

DETAILED DESCRIPTION OF THE INVENTION

The improvements indicated in the BRIEF SUMMARY OF THE INVENTION are set forth in the following details with reference had to the Drawings. It is again pointed out that, although a mouse device is disclosed possessing the improvements, the invention concept is applicable to a wide range of I/O devices, and other tools as well.

Figure 1:
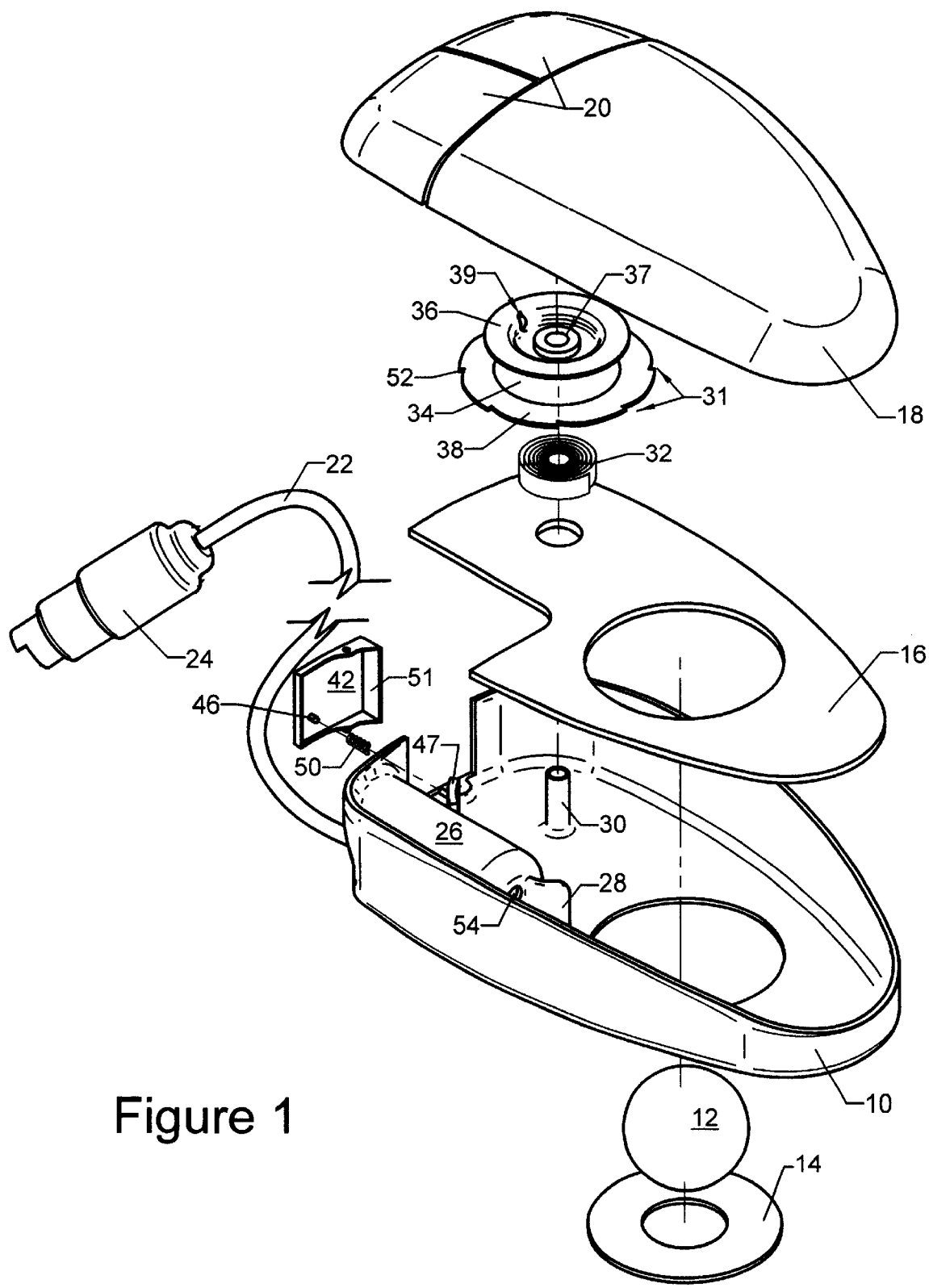
FIG. 1 is an exploded isometric view of the invention.

Reference being had to FIG. 1, this exploded view of the invention shows a typical or conventional computer mouse housing consisting of a lower case 10 and a top 18. The top contains, towards the front of the case, two keys or buttons 20. The cord 22 and its connector 24 pass through the case via hole 54 and pocket 26. The latter, here a cylindrical void, is formed in the case at any position that accommodates the other salient parts of the principal device and my improvements; I have placed it as shown for reasons that will become apparent. Other parts of the mouse device are: the roller ball 12; the ball cap 14; and the circuit board 16, that is configured to fit into the lower case 10.

Having described the fundamental components of a mouse, as well as the pocket 26 which serves as a protective berth for the connector 24, I refer the reader yet to FIG. 1 and continue with the cord guide 28 that allows the cord to be drawn smoothly in/out through hole 54 and toward the vertical axle or spindle 30. The circuit board precedes the capstan 31 elements into the case and is mounted as close to the case bottom as practicable. The capstan proper is fitted internally with circular spring 32 and fitted onto the spindle 30; thus are assembled the fundamental elements for controlling or managing the mouse cord 22. In this embodiment, designed to use a pawl and ratchet assembly to fix the cord at any extended position, the capstan 31 features a reel 34 with a top flange 36 and a bottom flange consisting in a notched or ratchet wheel 38. Both top and bottom flanges may be notched for convenience in manufacturing. The cord is wound about the reel 34, after it passes through aperture 39 and into sleeve 37, to be connected to the board 16 by conventional means such as slip rings (not shown). The description of the pawl assembly (42, 46, 47, 50 and 51) is deferred to subsequent figures.

Figure 2:
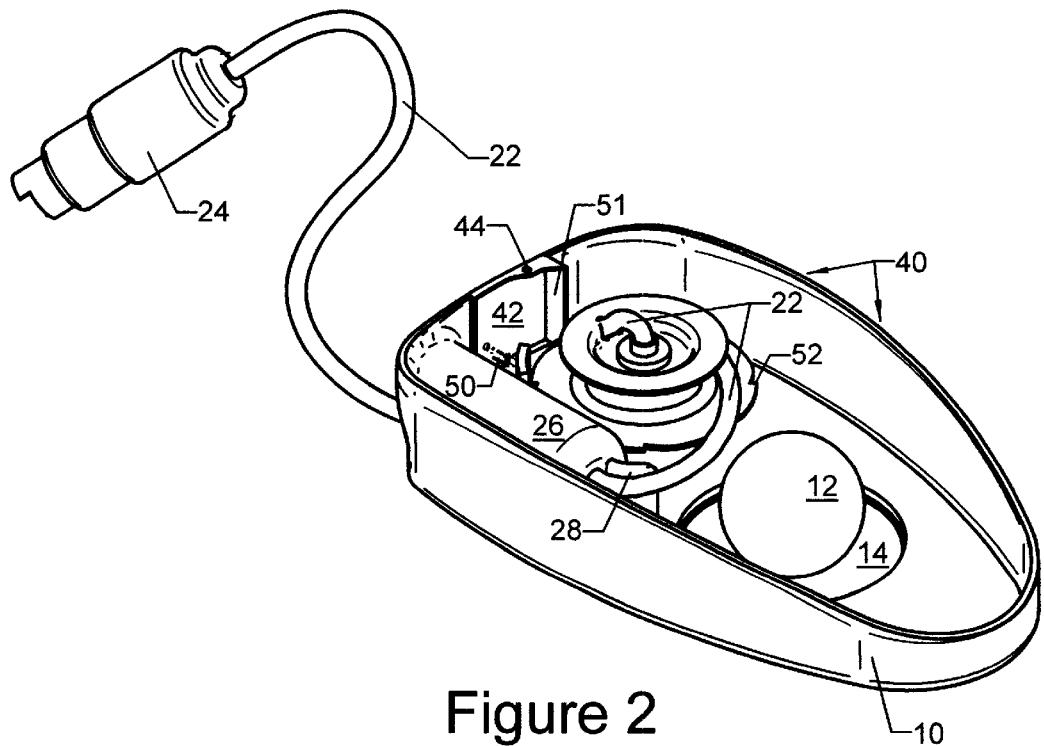
FIG. 2 is the invention viewed in FIG. 1, assembled but with the cover removed.
Figure 3:
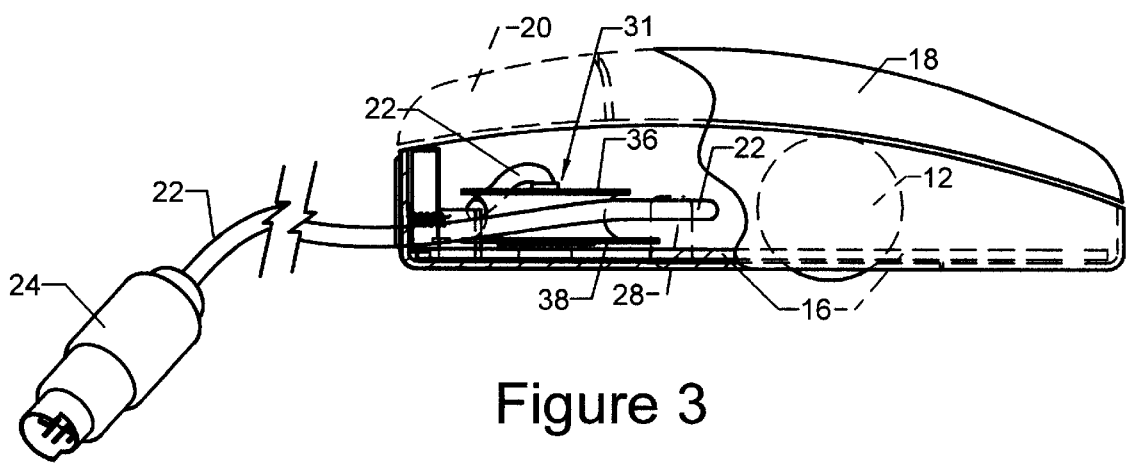
FIG. 3 is a side view of the invention in partial cut-away.
Figure 4:
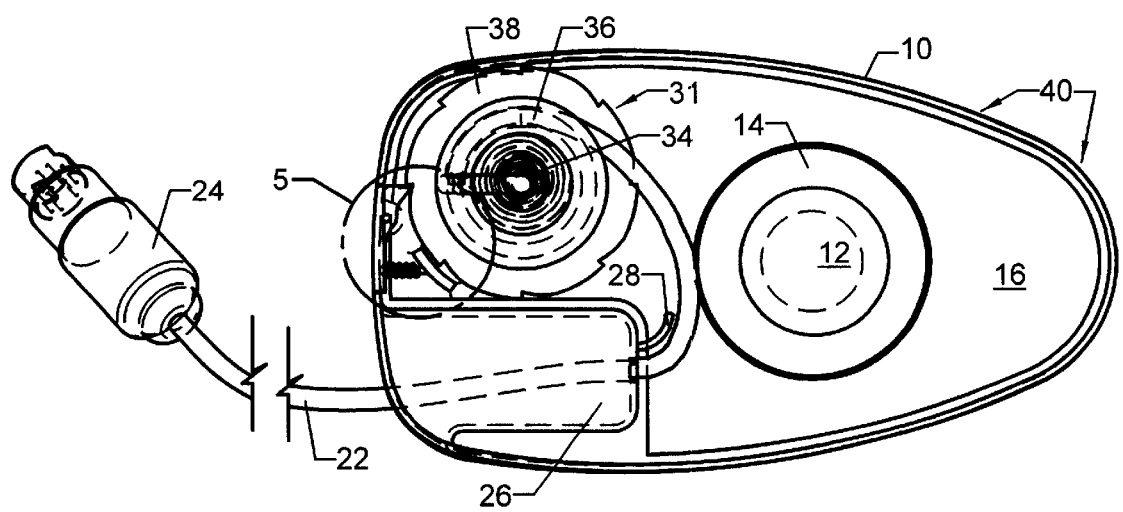
FIG. 4 is a plan view of the invention with the cover removed.

Referring now to FIGS. 2–4, the assembled invention 40 of FIG. 1 is shown, absent the case top, in FIGS. 2 and 3. FIG. 2 adds an element, a pivot pin 44, to the pawl member while FIG. 3 depicts passage of the cord 22 through pocket 26, around guide 28 and onto capstan 31. The plan view of FIG. 4 is illustrative of one possible component layout within the mouse case 10. Those skilled in the art will immediately recognize the possibility of interchanging the ball 12 positioning and that of the cord control capstan assembly 31. Such a positioning would allow a larger capstan assembly, still provide facility for the pawl-ratchet mechanism 38, 42 and obviate need for the cord guide 28; within this disclosure, I maintained the conventional ball layout simply to suit convention. Most notably in FIG. 4, a detail taken at 5 is presented as a simplified mechanization, at FIG. 5. Before leaving FIG. 4, however, the reader should envisage the pawl subassembly elements being located at either side, or the rear, of the mouse case; such situational choices remain, as with roller ball placement, a matter of manufacturing necessity or expedient.

Figure 5:
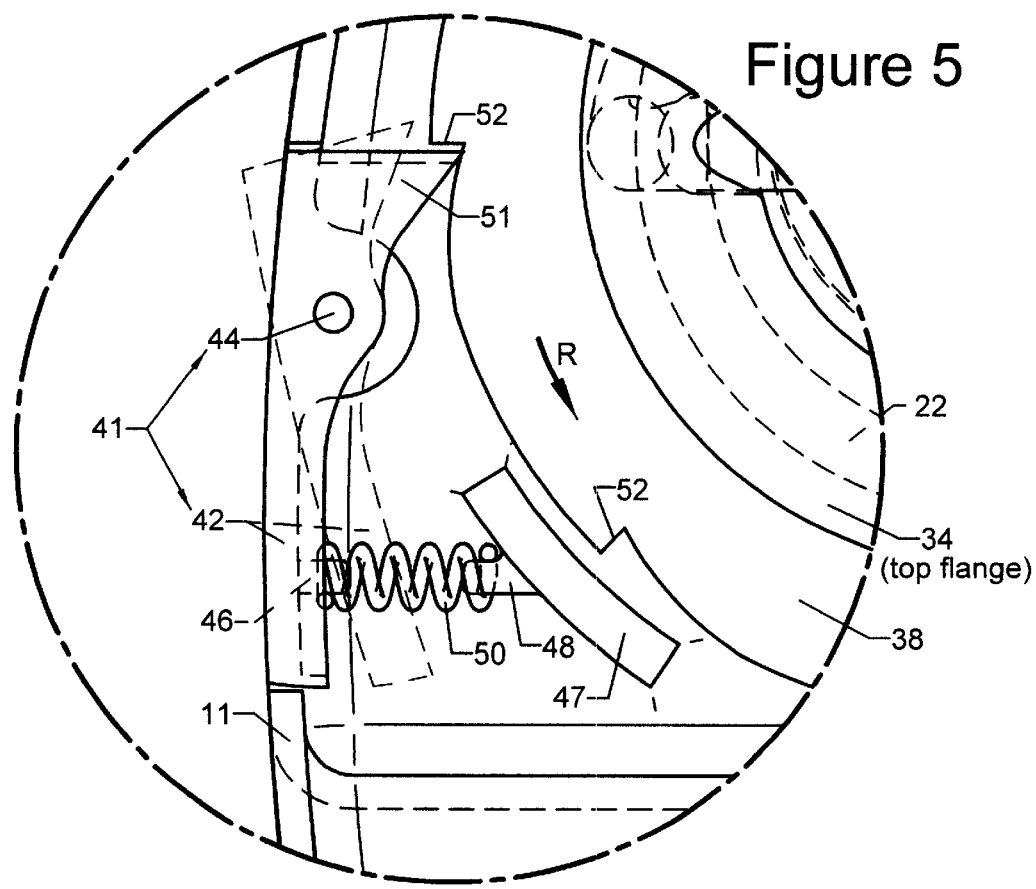
FIG. 5 is a detail taken at 5 of FIG. 4.

FIG. 5 is an enlargement of the above-mentioned detail, and shows clearly the few elements comprising the pawl subassembly 41: the pawl lever 42 mounted for depressive movement (with respect to outer case surface 11); a base piece 47; opposed detents 46 and 48 projecting, respectively, from the lever and the base piece; and, coil spring 50, mounted endwise over each of the detents, biasing the pawl lever outward of the ratchet wheel 38. The recoil direction of the ratchet is indicated "R" and notch or tooth 52 of the ratchet is seen engaged by tang 51, of the pawl lever, thus restraining retraction of the (extended) cord; disengagement of the pawl tang is indicated by its invisible portrayal. The top flange 36 of the reel 34 is of lesser diameter than the ratchet wheel 38, but can be the same size, notched and congruently aligned with the ratchet.

Figure 6:
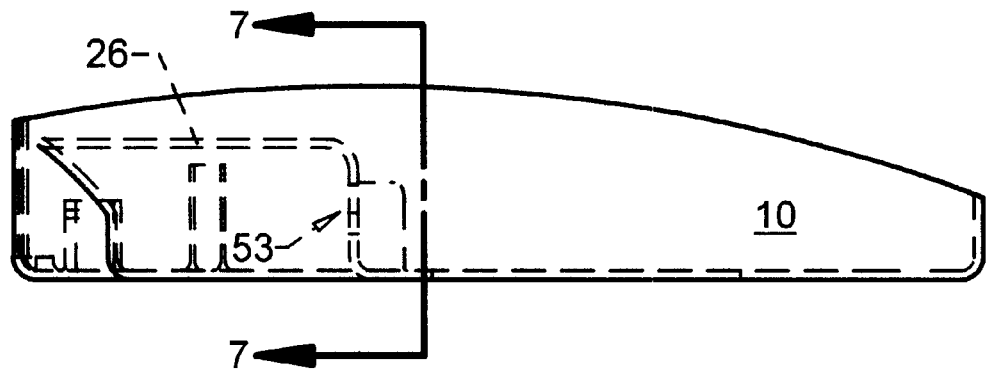
FIG. 6 is an side view of the case to show the 7—7 sectioning for FIG. 7.
Figure 7:
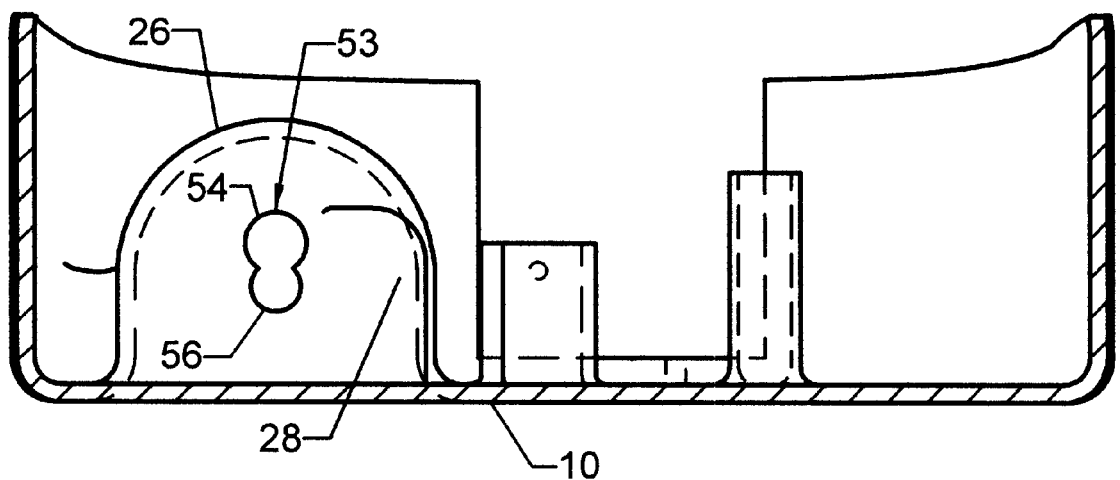
FIG. 7 is a frontal elevation depicting the connector pocket or port.

The second feature of my invention contemplates removal of the pawl member and use of a snubbing device for resistive capture of the cord. Reference being had to FIG. 6, there is shown section 7—7, taken behind the connector pocket 26. In the rear portion of the pocket, the normal cord opening 54 modified to a generally figure eight (8) void 53. FIG. 7 makes this modification clear in the frontal elevation of the (topless) case 10. The normal hole 54 is distended by a smaller diameter col 56 that snubs (or resistively captures) the larger diameter, but somewhat resilient, cord. The guide 28 would still be useful to prevent bending of the cord, unless the earlier transposition of the capstan and ball were to be used.

The concepts of the invention may be mechanized in several ways without departing from its spirit. The attributes of the improvements disclosed are therefore commended to the field, consistent with the hereinafter appended claims.

What is claimed is:

1. An electromechanical, data input device including a case, electronic circuitry, and an electrical cord connecting said circuitry, by passing readily through a hole in the case to an external connector that is adapted to connect the device to a data receiver, comprising:

a cord control means for storage, deployment and retraction of said cord respectively in, from and into the case, said cord control means further comprising a flanged, spring-biased reel, rotatably mounted on a spindle member, the reel having peripherally about at least one flanged end thereof a series of notches, a pawl member comprising a pivotally mounted, spring-biased lever, a fulcrum means disposed pivotally and proximate a side of the case, a tang portion at a first end of the lever for an engagement with and a disengagement from any notch of said series of notches and a second end of the lever presented outwardly of the case, whereby depressing and releasing said second end of the lever causes, respectively, tang disengagement from and engagement with any notch;

a securing means for fixing the cord temporarily at a deployed position, said securing means comprising a circular distention of the perimeter of the hole, effecting an essentially figure "8" shape, said distension having a diameter smaller than that of the cord, whereby inserting the cord thereinto effects capture and fixing of the cord at the deployed position; and a connector storing means comprising a pocket in the case that is substantially receptive of the connector.

2. An electromechanical, data input device including a case, electronic circuitry, and an electrical cord connecting said circuitry through a hole in the case to an external connector that is adapted to connect the device to a data receiver, comprising:

a rotatable reel disposed within the case for storage, deployment and retraction of said cord respectively in, from and into the case, the reel further comprising a spring-biased cylinder having at least one end flange that hears circumferentially thereabout a series of notches;

a pawl member for fixing the cord temporarily at a deployed position, the pawl member defined by a pivotally-mounted lever bearing a tang at a first end thereof, the lever being spring-biased to a first position that effects engagement of the tang with a notch of said series and concomitantly restrains cord-retraction rotation of the reel, said lever being manually positionable to a second, tang-disengagement position; and a connector securing means disposed in the case and defined by a pocket, coaxial said hole, that is sufficient to envelop a substantial portion of the connector where in a fully retracted position,
  wherein the hole is a stylized figure "8" void, one portion of the hole having a diameter smaller than the cord and the other portion sufficiently large for the cord to pass freely therethrough.

3. An improvement to a data I/O device that features a case, electronic circuitry, and an electrical cord connecting said circuitry through a hole in the case to an external connector that is adapted to connect the device to a data receiver, said improvement comprising:

a spring-biased, rotatable reel, internal of the case, for storage, extension and retraction of said cord respectively in, from and into the case;

a capturing means for fixing the cord temporarily at a deployed position, said securing means comprising a circular distention of the perimeter of the hole, effecting an essentially figure "8" void, said distension having a diameter smaller than that of the cord, whereby manually pressing the cord thereinto effects capture and fixing of the cord at the deployed position; and a connector securing means disposed in the case and defined by a pocket, coaxial said hole, that is sufficient to envelop a substantial portion of the connector when in a fully retracted position.

* * * * *